March 5, 1929.     L. CHAUVIÈRE     1,704,034
AIRCRAFT PROVIDED WITH ROTATING WING SURFACES
Filed Oct. 5, 1926     4 Sheets-Sheet 2
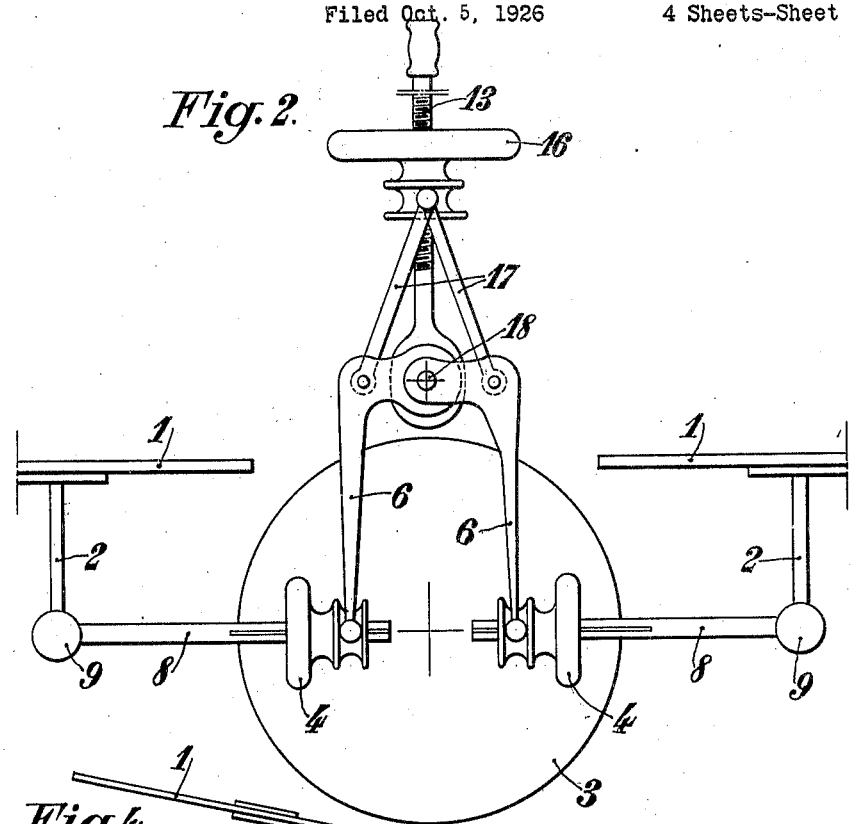
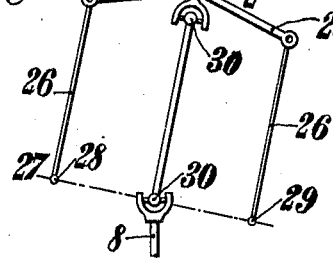
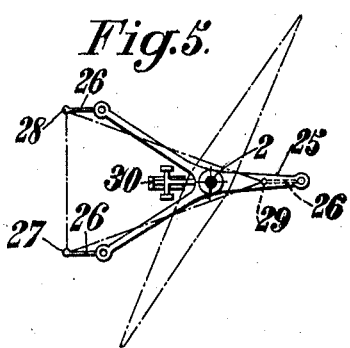
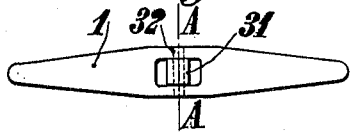
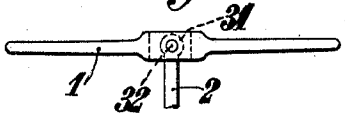
L. Chauvière
inventor
By: Marks & Clark
Attys

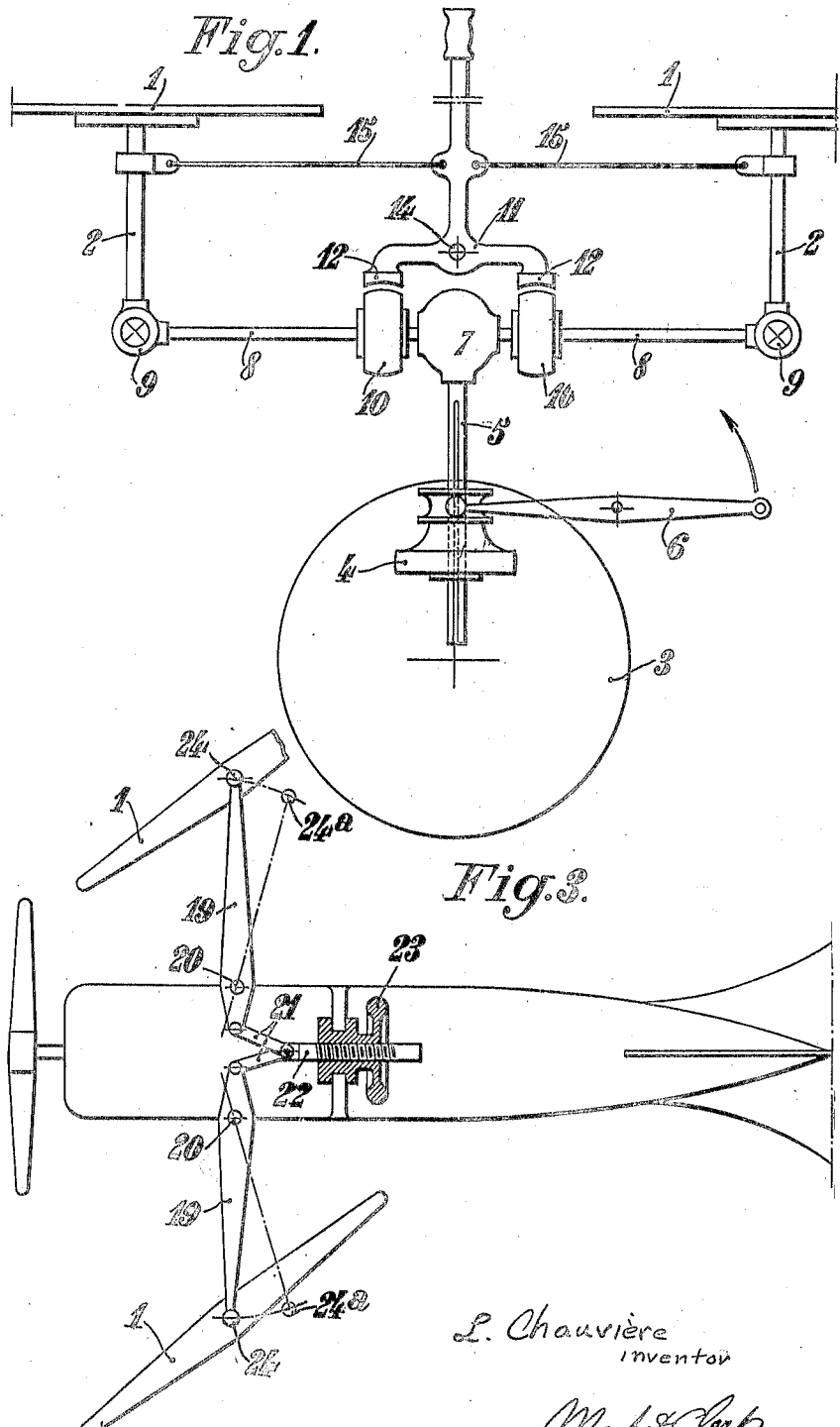

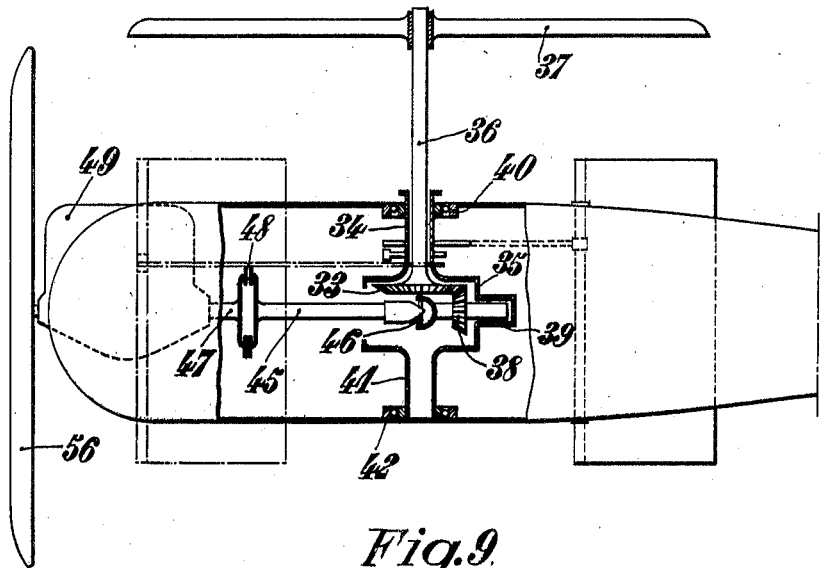
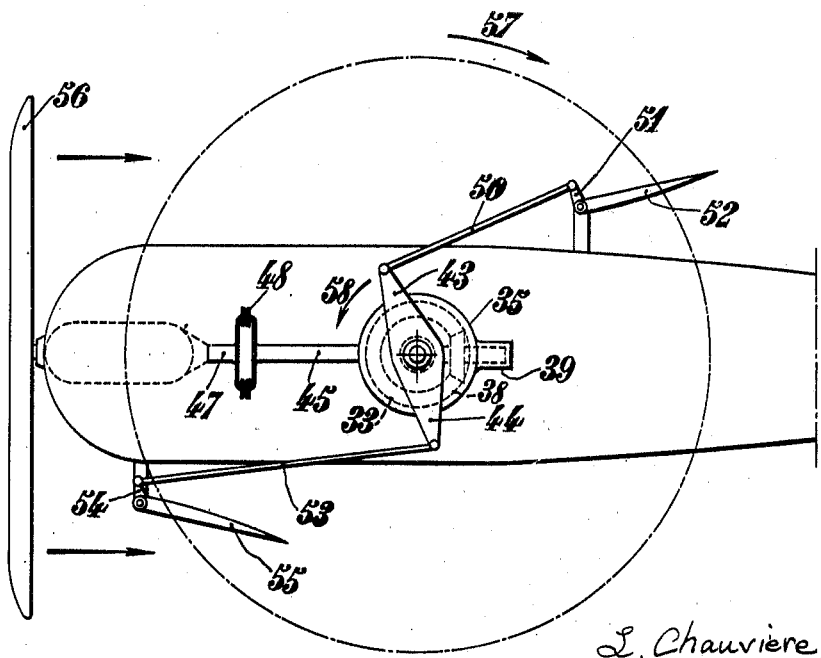

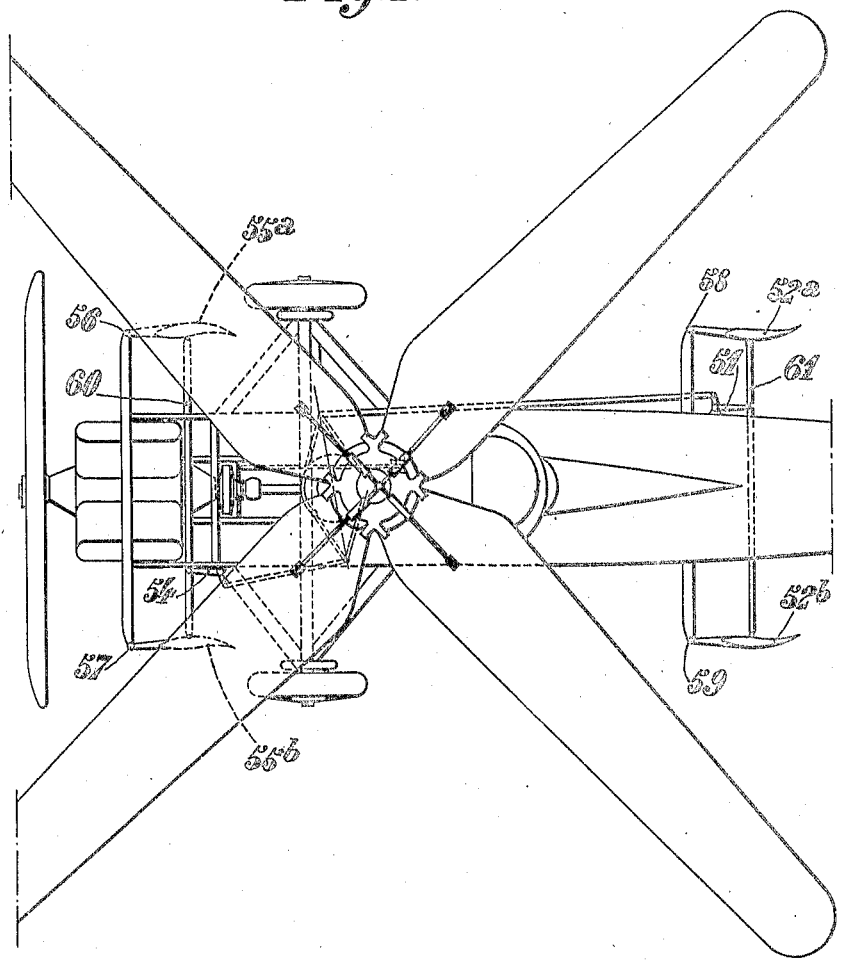

Patented Mar. 5, 1929.

1,704,034

UNITED STATES PATENT OFFICE.

LUCIEN CHAUVIÈRE, OF PARIS, FRANCE.

AIRCRAFT PROVIDED WITH ROTATING WING SURFACES.

Application filed October 5, 1926, Serial No. 139,683, and in France February 4, 1926.

This invention relates to improvements in aircrafts the wing surfaces of which are partly or entirely constituted by rotating surfaces which form variable bearing surfaces. These surfaces will be designated hereinafter by the term "gyrocopters."

The main objects of these improvements are:

1. In gyrocopters having two rotating wing surfaces, with different axes of rotation, to use the said rotating surfaces for reestablishing the longitudinal or transverse balance of the aircraft and to employ the said surfaces for obtaining a braking action upon landing.

2. In all gyrocopters, whatever may be the number and the arrangement of the rotating wing surfaces, to rationally distribute the driving power on the shaft of the tractor propeller and on those of the rotating wing surfaces.

3. In gyrocopters having a single rotating wing surface, to balance the reaction torque of this wing surface without giving rise to transverse component modifying the orientation of the trajectory.

For carrying out into practice the first of the above mentioned objects, the axes causing the wing surfaces to rotate are independently connected to the source of driving power, through the medium of change speed gears which can be simultaneously or independently controlled and of universal joints or gear joints, so that it will be possible, by modifying the speed of rotation, to vary the lifting power and the position of the center of thrust of the said surfaces relatively to the center of gravity of the aircraft, for obtaining, among others, the reestablishment of the longitudinal and transverse balance and the braking action upon landing.

For carrying out the second object of the invention the present improvements reside in that the power transmitted to the rotating wing surfaces varies in accordance with the power transmitted to the tractor propeller. That is to say the rotating wing surfaces must rotate so much the more quicker as the rotation of the tractor propeller is increased. The invention comprises therefore the arrangement, on the one hand, of a mechanism permitting, for a constant speed of the engine, modifying the power transmitted to the propeller (change speed gear or mechanism for varying the pitch) and, on the other hand, of another change speed gear permitting to modify at the same time, the speed of rotation of the rotating wing surfaces. Both above mentioned mechanisms can be controlled either separately, or simultaneously by common controls.

Use can also be made of two independent engines: one acting on the tractor propeller and the other on the lift vanes.

Finally, for realizing its third object, the invention comprises an arrangement according to which the shaft controlling the rotation of the rotating wing surface is driven through the intermediary of a pinion rigidly secured on this shaft and gearing with another pinion actuated by the driving shaft by means of a universal joint, the center of which is on an extension of the axis of rotation of the rotating wing surface, the said pinion being supported by a bearing belonging to a casing movable about an axis coinciding with that of the rotating wing surface, the said casing being connected by a rigging to at least one blade arranged in the wind of the propeller, or in the wind arising from the speed of advance of the machine. The rotation of the rotating wing surface produces on the casing a reaction torque, so that the said casing tends to rotate and to place the blade or blades, to which it is connected, obliquely relatively to the air streams, this giving rise on these blades to a torque balancing the preceding one.

The accompanying diagrammatic drawing illustrates, by way of example only, various forms of construction of devices for carrying out the improvements such as above characterized.

Figs. 1 and 2 illustrate two modifications of devices for driving the shafts actuating the wing surfaces.

Figure 3 is a plan view of an aircraft provided with surfaces the centers of thrust of which are displaceable.

Figure 4 is a modification of a device for modifying the inclination of the axis of a rotating surface.

Figure 5 is a corresponding plan view.

Figures 6 and 7 illustrate, in elevation and plan view the assemblage of a surface on its axis for remedying the gyroscopic effects during the changes of inclination of the said axis.

Figs. 8 and 9 illustrate, in elevation and plan view, a diagrammatic arrangement of the balancing system of the reaction torque of the rotating wing surface.

Fig. 10 shows in plan view another form of construction of this device.

In Fig. 1, the device is supposed to be seen in end view, the observer being for instance placed facing the tractor propeller of an aircraft, the rotating wing surfaces of which are constituted by suitable surfaces 1 (two in number in the example shown) which are caused to rotate by means of axes 2.

These two surfaces 1 are arranged on either side of the traction axis of the tractor propeller, which axis is generally the longitudinal axis of the machine.

The rotation of the surfaces 1 is ensured by means of a device composed of a plate 3 and a friction roller 4 and constitutes a progressive change speed gear. The plate 3 is continuously caused to rotate by a suitable source of power and the friction roller 4 angularly secured on the shaft 5, but longitudinally movable, is subjected to the control of a lever or fork 6 connected, by any suitable rigging, to a driving member within reach of the pilot of the machine. The shaft 5 is connected, by suitable gears constituting a differential gear 7, to two transverse shafts 8 which, by universal joints 9 of any suitable arrangement (bevel pinions for instance) transmit their movement to the shafts 2 of the surfaces 1, whilst permitting a variable inclination of these shafts 2. Friction drums 10 are rigidly secured on each shaft 8 and a rocking lever 11 pivoted at 14 and carrying friction shoes 12 can, by means of the lever 13, bring one of the other of the shoes 12 in contact with the drum 10 to which it corresponds. Owing to the differential gear 7, it will be seen that by causing a variation of the braking stress on a drum 10, the speed of rotation of a surface 1 relatively to the other is modified at will, so as to obtain a difference of lifting power for modifying the conditions of transverse balance of the machine. By connecting by means of links 15 the shafts 2 and the lever 13, or another independent lever, it is also possible to vary the inclination of the shafts 2 and, consequently, to modify the positions of the centers of thrust of the surfaces 1 relatively to the center of gravity of the machine, this constituting another means permitting to re-establish the transverse balance. By modifying, by means of the lever 6, the position of the roller 4 relatively to the center of the driving-plate 3, the speed of rotation of the surfaces 1 can be varied, in particular for the purpose of increasing the lifting power for obtaining a braking action upon landing.

The same results as those above mentioned can be obtained by actuating each surface 1 by means of an independent roller 4, as shown in Fig. 2. The position of the rollers 4 relatively to the center of the driving plate 3 can be varied by operating a hand wheel forming a nut screwed on the screw threaded rod of 16 stabilizing lever 13. The operation of the hand-wheel 16 acts, through the links 17, upon the levers or forks 6 pivoted at the fixed point 18 for symmetrically displacing the two rollers 4 and, consequently, for varying according to the same extent and in the same direction the speed of rotation of the surfaces 1. In these conditions, the total lifting power of the machine varies as well as the conditions of longitudinal balance, but the transverse balance is not modified. For modifying the conditions of transverse balancing, it suffices to incline the lever 13 to the right or to the left. The two rollers 4 are simultaneously displaced and in such a manner that one moves towards the center of the driving plate 3 whilst the other moves away from the said center, this producing a reduction of angular speed of a surface 1 and an increase of the other, and consequently a modification of the transverse balance.

It is obvious that the rotating surfaces 1 can be either the lifting surfaces of the machine, or secondary surfaces simply adapted to re-establish the balance and to act at the time of landing for reducing the speed of fall.

Fig. 3 shows a device for displacing the center of the rotating surfaces 1 in order to bring the center of thrust of the whole of the aircraft to a suitable point for modifying the conditions of flight. The frames carrying the shafts 8 of the surfaces 1 are projected in plan in the shape of levers 19 pivoted about axes 20 secured on the fuselage of the machine and the ends of these levers 19 are connected to links 21 attached to a screw 22 which is moved in translation by a hand-wheel 23 forming a nut. By a suitable operation of the hand-wheel 23, the two centers of thrust of the surfaces 1 are symmetrically displaced. These centers can, for instance, pass from the positions 24 to the positions 24ª. This operation can complete the action of the elevator and, without being indispensable, permits flight with the most favorable position of the fuselage. It is to be noted that, for permitting this operation, the driving shafts 2 of Fig. 1 must be provided with joints of the Cardan type at each of their ends.

The longitudinal balance and the transverse balance can also be obtained by mounting the shaft 2 of each rotating surface 1 on a support 25 (Figs. 4 and 5) connected by rods 26 pivoted or not to a rigid base 27—28—29, suitably chosen; this base can be fixed on the keelson of the machine or it can be subjected to the action of any suitable driving device. The shaft 2 of the surface 1 is connected to the driving shaft 8 by two Cardan joints. The center of the lower Cardan joint is the center of oscillation of the base 27—28—29 and consequently of the entire system, so that, whatever may be the general oscillation of the system, the direction of the resultant of the stresses applied to this system can always pass through one and the same point which is the center of the lower Cardan joint.

For attenuating, to a certain extent, the reactions due to the gyroscopic effect of the surfaces 1, when it is desired to modify the inclination of their axis or driving shaft 2, the latter can be connected to the surface it drives, so as to permit an oscillation of the said surface relatively to the theoretical axis of rotation. For that purpose (Figs. 6 and 7) the driving shaft 2 is provided at its upper part with a bearing 31 in which is mounted a transverse axis 32 of the surface 1 recessed at its central part in order to be able, during a change of inclination of the shaft 2, to oscillate about the theoretical axis A—A. It is thus possible to reduce, to a certain extent, the reactions or gyroscopic effects which oppose themselves to the changes of direction of the axes driving material and, consequently, heavy surfaces. The rotating surface 1 might also be connected to the axis 2 through the medium of a system of free wheel provided with a pawl, balls or rollers, or of any other construction, having for object to permit its actuation by the axis or to ensure its free rotation.

Concerning the improvements relating to the second object of the invention, it has been indicated that the said improvements substantially comprise a mechanism permitting, for a constant speed of the engine, to modify the power transmitted to the propeller and, on the other hand, a mechanism permitting to simultaneously modify the speed of rotation of the rotating wing surfaces. The first mechanism, serving to modify the power transmitted by the propeller, can be constituted by a device permitting to vary the pitch of this propeller; it can also be constituted by a change speed gear of any suitable type. These two mechanisms can be actuated by a single drive, thus permitting synchronizing the variations of the speeds of the tractor propeller and of the rotating wing surface; they can also be actuated by separate drives.

For carrying out the second object of the invention, use might also be made of an epicyclic gear such as a differential gear, combined with a change speed gear arranged on one of the two secondary shafts, one of these shafts driving the propeller, the other controlling the rotation of the rotating wing surfaces. If use is made of a differential gear, that is to say an epicyclic gear of ratio $-1$, the gyration of which is controlled by the engine having a constant speed, it is known that the sum of two secondary rotations is constant; supposing a change speed gear is arranged on the secondary shaft driving the propeller or that this propeller is provided with a device for varying the pitch, to any variation of speed of this propeller will consequently correspond a variation of reverse direction of the speed of rotation of the secondary shaft driving the rotating wing surfaces. In this case, consequently, a single drive is necessary for producing the synchronous variations of the speed of the propeller and of that of the rotating wing surfaces.

The device illustrated in Figs. 8 and 9 is adapted, as previously indicated, to balance the reaction torque of the rotating wing surface of a gyropter having a single wing surface, without giving rise to transverse components modifying the orientation of the trajectory.

The method which appears to be more simple for balancing the reaction torque of a machine having a single wing surface consists in correcting the trajectory by means of the rudder, but this supplementary operation, owing to the variation of the driving torque of the wing, is very delicate. Moreover, if the reaction of the wing surface is compensated, a transverse component however results having for effect to orientate the trajectory according to a longitudinal axis of the gyropter. It can be said that the direction which is not parallel to the gyropter would move in this case in a "crab like manner."

The device forming the subject-matter of the invention avoids this inconvenience.

In the example of Figs. 8 and 9, a bevel wheel 33 rotates in a bearing 34 forming a part of a casing 35; this bevel wheel 33 is rigid with a shaft 36 to the end of which is keyed the single rotating wing surface 37. The wheel 33 is rotated by a corresponding bevel wheel 38 rotating in a bearing 39 belonging to the casing 35. This casing can be journalled in the frame of the machine by means of the tail piece constituting the bearing 34, which is supported by the bearing 40, and by means of a second tail piece 41 carried by the bearing 42; the bearings 40 and 42 are integral with the fuselage of the gyropter.

The casing 35 carries two opposite levers 43 and 44 which, substantially, are arranged at right angles to the plane formed by the axis of the pinion 38 and by the axis of the shaft 36.

In order to permit a certain oscillation of the casing 35 in the bearings 40 and 41, the pinion 38 is driven by the driving shaft 45 by means of a Cardan joint 46, or other universal joint; the center of this Cardan joint 46 is conveniently placed at the intersection of the axes of the shaft 36 and pinion 38. The shaft 45 is preferably connected to the primary shaft 47 of the engine by a clutch 48, so that the shaft 45 can be driven or not by the engine 49.

The end of the lever 43 is connected by a connecting rod 50 to the end of a lever 51 pivoted on the fuselage and rigid with a surface 52 substantially placed in the zone of action of the wind of the tractor propeller. Likewise, an end of the lever 44 is connected by a connecting rod 53 to a lever 54 rigid with a second surface 55 similar to the surface 52.

The operation of the device is as follows:

The shaft 45 being thrown in gear, the engine 49 causes the shaft 45 to rotate at the same time as the propeller 56; the latter causes behind itself a movement of air the speed of which will always be greater than the speed of the machine. If the shaft 45 is unclutched, the wind caused by the moving propeller has the effect of simply touching the surfaces 52 and 55 according to its direction.

If the shaft 45 is thrown in gear, the wing surface 37 is caused to rotate, but as it takes a bearing on the air through its blades, it will determine a reaction torque, which through the medium of the pinions 33 and 38, is transmitted to the casing 35 so as to tend to cause the latter to rotate in the bearings 40 and 42 in reverse direction to the rotation of the wing. If the wing rotates in the direction of the arrow 57, the stress exerted on the casing 35 is directed according to the arrow 58.

The connecting rods 50 and 53 will transmit the stress received by the casing 35 to the surfaces 52 and 55 for placing them obliquely relatively to the direction of the air streams. An aerodynamic stress will result therefrom, which will become greater and greater in proportion to the increase of the angular displacement of the panels 52 and 55. The moment of this stress will obviously increase at the same time.

When the value of this moment will reach that of the moment of the torque to be overcome, the oscillating system will be in a position of balance which will exist whatever may be the value of the torque, if this value is inferior to the possible maximum.

Only one of the surfaces 52 and 55 might be provided; if, in this case, the action of the air on the surface is examined, it will be seen that the latter will determine, besides the above mentioned reaction moment, a direction of movement which will be added to that of the airplane. The stress exerted on the blade 52 can be transferred to the center of gravity, thus causing, at this point, a torque the moment of which is that of the torque to be overcome, and a transverse stress capable of modifying the flight of the machine. The trajectory might always be re-established by the steering members, but the device described, provided with the two surfaces 52 and 55, does away with the above mentioned inconvenience.

The example of Fig. 10 is quite similar to the preceding one; however, the surfaces 52 and 55 are doubled at $52^a$—$52^b$ and $55^a$—$55^b$. The corresponding surfaces are pivoted at 56—57 and 58—59; their movements are conjugated by the connecting rods 60 on the one hand and 61 on the other hand; the said connecting rods are controlled by the levers 51 and 54. The operation is quite similar to that previously described.

It may happen, in certain cases, that it would be advantageous to brake the rotation of the rotating wing surfaces upon landing. This braking presents no difficulty in the case of multiple rotating surfaces. But when there is a single rotating surface, a device for balancing the rotation torque is necessary; this device can be realized for instance by connecting the attaching member of the brake to the balancing casing, so that the reaction may be absorbed by the ailerons or air flaps placed in the relative wind. Side hooks can also be placed on the rear tail skid, these hooks preventing the fuselage from turning at the time the rotating surfaces are braked.

Of course, the forms of construction indicated above are capable of receiving a great number of modifications which, as they do not alter in any way the essential features and the purpose sought for, are included within the scope of the invention.

What I claim as my invention and desire to secure by Letters Patent is:

In an aircraft having a rotatable wing surface, a shaft for rotating said wing surface, a pinion rigidly secured to said shaft, a driving shaft, a second pinion coacting with said first mentioned pinion, a universal joint connecting said second pinion to said driving shaft, the center of said universal joint being in axial alignment with the center of rotation of said wing surface, a casing surrounding said joint, a bearing for said second pinion in said casing and a blade connected to said casing, said blade being arranged to resist wind pressure transversely to said first mentioned shaft and balance the torque produced in said casing during rotation of said wing surface.

In testimony whereof I have signed my name to this specification.

LUCIEN CHAUVIÈRE.